(12) United States Patent  
Jandhyala et al.

(10) Patent No.: US 8,725,484 B2  
(45) Date of Patent: May 13, 2014

(54) ADAPTIVE REDUNDANCY-EXTRACTION FOR 3D ELECTROMAGNETIC SIMULATION OF ELECTRONIC SYSTEMS

(75) Inventors: Vikram Jandhyala, Seattle, WA (US); Swagato Chakraborty, Kirkland, WA (US); Dipanjan Gope, Kirkland, WA (US)

(73) Assignee: Physware, Inc., Bellevue, WA (US)

( * ) Notice: Subject to any disclaimer, the term of this patent is extended or adjusted under 35 U.S.C. 154(b) by 560 days.

(21) Appl. No.: 13/082,818

(22) Filed: Apr. 8, 2011

(65) Prior Publication Data

US 2012/0259598 A1    Oct. 11, 2012

(51) Int. Cl.
*G06F 17/50* (2006.01)

(52) U.S. Cl.
USPC ............................................. 703/14

(58) Field of Classification Search
USPC ............ 703/1, 2, 14; 716/109, 120, 127, 133; 324/144, 430, 525, 750.11; 361/133
See application file for complete search history.

(56) References Cited

U.S. PATENT DOCUMENTS 7,331,023 B2 *    2/2008    Sercu et al. .................... 716/136

OTHER PUBLICATIONS

Wenjian Yu (Interconnect Parasitic Extraction, 2006 (78 pages).*

* cited by examiner

*Primary Examiner* — Kandasamy Thangavelu
*Assistant Examiner* — Andre Pierre Louis
(74) *Attorney, Agent, or Firm* — The Webb Law Firm

(57) ABSTRACT

Redundancy extraction in electromagnetic simulation of an electronic device/system includes discretizing first and second spaced conductive layers of a computer model of an electronic device/system into first and second meshes M1 and M2. For each edge between cells of each mesh, a current flow across the edge in response to application of an exemplary bias to the geometry is determined. A square impedance matrix Z* is determined which, for each instance of equal magnitude and opposite direction current flows (EMODCF) in edges E1 and E2 of M1 and M2, has one less row and one less column than the total number of edges in M1 and M2. A voltage column vector V* is also determined which, for each instance of EMODCF, has one less row than the total number of edges in M1 and M2. A current column vector [I*]=[V*]/[Z*] is then determined.

18 Claims, 13 Drawing Sheets

FIG. 3A PRIOR ART

|  | 8 | 9 | 10 | 11 | 12 | 13 | 14 |
|---|---|---|---|---|---|---|---|
|  | $Z_{1,8}$ | $Z_{1,9}$ | $Z_{1,10}$ | $Z_{1,11}$ | $Z_{1,12}$ | $Z_{1,13}$ | $Z_{1,14}$ |
|  | $Z_{2,8}$ | $Z_{2,9}$ | $Z_{2,10}$ | $Z_{2,11}$ | $Z_{2,12}$ | $Z_{2,13}$ | $Z_{2,14}$ |
|  | $Z_{3,8}$ | $Z_{3,9}$ | $Z_{3,10}$ | $Z_{3,11}$ | $Z_{3,12}$ | $Z_{3,13}$ | $Z_{3,14}$ |
|  | $Z_{4,8}$ | $Z_{4,9}$ | $Z_{4,10}$ | $Z_{4,11}$ | $Z_{4,12}$ | $Z_{4,13}$ | $Z_{4,14}$ |
|  | $Z_{5,8}$ | $Z_{5,9}$ | $Z_{5,10}$ | $Z_{5,11}$ | $Z_{5,12}$ | $Z_{5,13}$ | $Z_{5,14}$ |
|  | $Z_{6,8}$ | $Z_{6,9}$ | $Z_{6,10}$ | $Z_{6,11}$ | $Z_{6,12}$ | $Z_{6,13}$ | $Z_{6,14}$ |
|  | $Z_{7,8}$ | $Z_{7,9}$ | $Z_{7,10}$ | $Z_{7,11}$ | $Z_{7,12}$ | $Z_{7,13}$ | $Z_{7,14}$ |
|  | $Z_{8,8}$ | $Z_{8,9}$ | $Z_{8,10}$ | $Z_{8,11}$ | $Z_{8,12}$ | $Z_{8,13}$ | $Z_{8,14}$ |
|  | $Z_{9,8}$ | $Z_{9,9}$ | $Z_{9,10}$ | $Z_{9,11}$ | $Z_{9,12}$ | $Z_{9,13}$ | $Z_{9,14}$ |
|  | $Z_{10,8}$ | $Z_{10,9}$ | $Z_{10,10}$ | $Z_{10,11}$ | $Z_{10,12}$ | $Z_{10,13}$ | $Z_{10,14}$ |
|  | $Z_{11,8}$ | $Z_{11,9}$ | $Z_{11,10}$ | $Z_{11,11}$ | $Z_{11,12}$ | $Z_{11,13}$ | $Z_{11,14}$ |
|  | $Z_{12,8}$ | $Z_{12,9}$ | $Z_{12,10}$ | $Z_{12,11}$ | $Z_{12,12}$ | $Z_{12,13}$ | $Z_{12,14}$ |
|  | $Z_{13,8}$ | $Z_{13,9}$ | $Z_{13,10}$ | $Z_{13,11}$ | $Z_{13,12}$ | $Z_{13,13}$ | $Z_{13,14}$ |
|  | $Z_{14,8}$ | $Z_{14,9}$ | $Z_{14,10}$ | $Z_{14,11}$ | $Z_{14,12}$ | $Z_{14,13}$ | $Z_{14,14}$ |
|  | $Z_{15,8}$ | $Z_{15,9}$ | $Z_{15,10}$ | $Z_{15,11}$ | $Z_{15,12}$ | $Z_{15,13}$ | $Z_{15,14}$ |
|  | $Z_{16,8}$ | $Z_{16,9}$ | $Z_{16,10}$ | $Z_{16,11}$ | $Z_{16,12}$ | $Z_{16,13}$ | $Z_{16,14}$ |
|  | $Z_{17,8}$ | $Z_{17,9}$ | $Z_{17,10}$ | $Z_{17,11}$ | $Z_{17,12}$ | $Z_{17,13}$ | $Z_{17,14}$ |
|  | $Z_{18,8}$ | $Z_{18,9}$ | $Z_{18,10}$ | $Z_{18,11}$ | $Z_{18,12}$ | $Z_{18,13}$ | $Z_{18,14}$ |

FIG. 3B  PRIOR ART $$[I] = \frac{[V]}{[Z]} = [Z]^{-1}[V]$$

FIG. 4
PRIOR ART

|   | 1 | 2 | 3 | 4 | 5 | 6 |
|---|---|---|---|---|---|---|
| 1 | $Z_{1,1} - Z_{10,1} - Z_{1,10}$ | $Z_{1,2} - Z_{10,1}$ | $Z_{1,3} - Z_{10,1}$ | $Z_{1,4} - Z_{10,1}$ | $Z_{1,5} - Z_{10,1}$ | $Z_{1,6} - Z_{10,1}$ |
| 2 | $Z_{2,1} - Z_{2,10}$ | $Z_{2,2}$ | $Z_{2,3}$ | $Z_{2,4}$ | $Z_{2,5}$ | $Z_{2,6}$ |
| 3 | $Z_{3,1} - Z_{3,10}$ | $Z_{3,2}$ | $Z_{3,3}$ | $Z_{3,4}$ | $Z_{3,5}$ | $Z_{3,6}$ |
| 4 | $Z_{4,1} - Z_{4,10}$ | $Z_{4,2}$ | $Z_{4,3}$ | $Z_{4,4}$ | $Z_{4,5}$ | $Z_{4,6}$ |
| 5 | $Z_{5,1} - Z_{5,10}$ | $Z_{5,2}$ | $Z_{5,3}$ | $Z_{5,4}$ | $Z_{5,5}$ | $Z_{5,6}$ |
| 6 | $Z_{6,1} - Z_{6,10}$ | $Z_{6,2}$ | $Z_{6,3}$ | $Z_{6,4}$ | $Z_{6,5}$ | $Z_{6,6}$ |
| 7 | $Z_{7,1} - Z_{7,10}$ | $Z_{7,2}$ | $Z_{7,3}$ | $Z_{7,4}$ | $Z_{7,5}$ | $Z_{7,6}$ |
| 8 | $Z_{8,1} - Z_{8,10}$ | $Z_{8,2}$ | $Z_{8,3}$ | $Z_{8,4}$ | $Z_{8,5}$ | $Z_{8,6}$ |
| 9 | $Z_{9,1} - Z_{9,10}$ | $Z_{9,2}$ | $Z_{9,3}$ | $Z_{9,4}$ | $Z_{9,5}$ | $Z_{9,6}$ |
| 10 | $Z_{11,1} - Z_{11,10}$ | $Z_{11,2}$ | $Z_{11,3}$ | $Z_{11,4}$ | $Z_{11,5}$ | $Z_{11,6}$ |
| 11 | $Z_{12,1} - Z_{12,10}$ | $Z_{12,2}$ | $Z_{12,3}$ | $Z_{12,4}$ | $Z_{12,5}$ | $Z_{12,6}$ |
| 12 | $Z_{13,1} - Z_{13,10}$ | $Z_{13,2}$ | $Z_{13,3}$ | $Z_{13,4}$ | $Z_{13,5}$ | $Z_{13,6}$ |
| 13 | $Z_{14,1} - Z_{14,10}$ | $Z_{14,2}$ | $Z_{14,3}$ | $Z_{14,4}$ | $Z_{14,5}$ | $Z_{14,6}$ |
| 14 | $Z_{15,1} - Z_{15,10}$ | $Z_{15,2}$ | $Z_{15,3}$ | $Z_{15,4}$ | $Z_{15,5}$ | $Z_{15,6}$ |
| 15 | $Z_{16,1} - Z_{16,10}$ | $Z_{16,2}$ | $Z_{16,3}$ | $Z_{16,4}$ | $Z_{16,5}$ | $Z_{16,6}$ |
| 16 | $Z_{17,1} - Z_{17,10}$ | $Z_{17,2}$ | $Z_{17,3}$ | $Z_{17,4}$ | $Z_{17,5}$ | $Z_{17,6}$ |
| 17 | $Z_{18,1} - Z_{18,10}$ | $Z_{18,2}$ | $Z_{18,3}$ | $Z_{18,4}$ | $Z_{18,5}$ | $Z_{18,6}$ |

NOTE: ROW 10 FROM MATRIX 32 (CORRESPONDING TO $i$ (in $Z_{i,j}$) = EDGE E10) HAS BEEN OMITTED.

FIG. 5A

| | 7 | 8 | 9 | 10 | 11 | 12 |
|---|---|---|---|---|---|---|
| | $z_{1,7}-z_{10,1}$ | $z_{1,8}-z_{10,1}$ | $z_{1,9}-z_{10,1}$ | $z_{1,11}-z_{10,1}$ | $z_{1,12}-z_{10,1}$ | $z_{1,13}-z_{10,1}$ |
| | $z_{2,7}$ | $z_{2,8}$ | $z_{2,9}$ | $z_{2,11}$ | $z_{2,12}$ | $z_{2,13}$ |
| | $z_{3,7}$ | $z_{3,8}$ | $z_{3,9}$ | $z_{3,11}$ | $z_{3,12}$ | $z_{3,13}$ |
| | $z_{4,7}$ | $z_{4,8}$ | $z_{4,9}$ | $z_{4,11}$ | $z_{4,12}$ | $z_{4,13}$ |
| | $z_{5,7}$ | $z_{5,8}$ | $z_{5,9}$ | $z_{5,11}$ | $z_{5,12}$ | $z_{5,13}$ |
| | $z_{6,7}$ | $z_{6,8}$ | $z_{6,9}$ | $z_{6,11}$ | $z_{6,12}$ | $z_{6,13}$ |
| | $z_{7,7}$ | $z_{7,8}$ | $z_{7,9}$ | $z_{7,11}$ | $z_{7,12}$ | $z_{7,13}$ |
| | $z_{8,7}$ | $z_{8,8}$ | $z_{8,9}$ | $z_{8,11}$ | $z_{8,12}$ | $z_{8,13}$ |
| | $z_{9,7}$ | $z_{9,8}$ | $z_{9,9}$ | $z_{9,11}$ | $z_{9,12}$ | $z_{9,13}$ |
| | $z_{11,7}$ | $z_{11,8}$ | $z_{11,9}$ | $z_{11,11}$ | $z_{11,12}$ | $z_{11,13}$ |
| | $z_{12,7}$ | $z_{12,8}$ | $z_{12,9}$ | $z_{12,11}$ | $z_{12,12}$ | $z_{12,13}$ |
| | $z_{13,7}$ | $z_{13,8}$ | $z_{13,9}$ | $z_{13,11}$ | $z_{13,12}$ | $z_{13,13}$ |
| | $z_{14,7}$ | $z_{14,8}$ | $z_{14,9}$ | $z_{14,11}$ | $z_{14,12}$ | $z_{14,13}$ |
| | $z_{15,7}$ | $z_{15,8}$ | $z_{15,9}$ | $z_{15,11}$ | $z_{15,12}$ | $z_{15,13}$ |
| | $z_{16,7}$ | $z_{16,8}$ | $z_{16,9}$ | $z_{16,11}$ | $z_{16,12}$ | $z_{16,13}$ |
| | $z_{17,7}$ | $z_{17,8}$ | $z_{17,9}$ | $z_{17,11}$ | $z_{17,12}$ | $z_{17,13}$ |
| | $z_{18,7}$ | $z_{18,8}$ | $z_{18,9}$ | $z_{18,11}$ | $z_{18,12}$ | $z_{18,13}$ |

NOTE: COLUMN 10 FROM MATRIX 32 (CORRESPONDING TO j (in $z_{i,j}$)= EDGE E10) HAS BEEN OMITTED.

FIG. 5B $$[I^*] = \frac{[V^*]}{[Z^*]} = [Z^*]^{-1}[V^*]$$

FIG. 6

$$[I^*] = \frac{[V^*]}{[Z^{}]} = [Z^{}]^{-1}[V^*]$$

FIG. 8

| | 1 | 2 | 3 | 4 | 5 | 6 |
|---|---|---|---|---|---|---|
| 1 | $Z_{1,1} - Z_{10,1} - Z_{1,10}$ | 0 | $Z_{1,3} - Z_{10,1}$ | 0 | 0 | $Z_{1,6} - Z_{10,1}$ |
| 2 | 0 | $Z_{2,2}$ | $Z_{2,3}$ | $Z_{2,4}$ | $Z_{2,5}$ | $Z_{2,6}$ |
| 3 | $Z_{3,1} - Z_{3,10}$ | $Z_{3,2}$ | $Z_{3,3}$ | $Z_{3,4}$ | $Z_{3,5}$ | $Z_{3,6}$ |
| 4 | 0 | $Z_{4,2}$ | $Z_{4,3}$ | $Z_{4,4}$ | $Z_{4,5}$ | $Z_{4,6}$ |
| 5 | 0 | $Z_{5,2}$ | $Z_{5,3}$ | $Z_{5,4}$ | $Z_{5,5}$ | $Z_{5,6}$ |
| 6 | $Z_{6,1} - Z_{6,10}$ | $Z_{6,2}$ | $Z_{6,3}$ | $Z_{6,4}$ | $Z_{6,5}$ | $Z_{6,6}$ |
| 7 | $Z_{7,1} - Z_{7,10}$ | $Z_{7,2}$ | $Z_{7,3}$ | $Z_{7,4}$ | $Z_{7,5}$ | $Z_{7,6}$ |
| 8 | 0 | $Z_{8,2}$ | $Z_{8,3}$ | $Z_{8,4}$ | $Z_{8,5}$ | $Z_{8,6}$ |
| 9 | $Z_{9,1} - Z_{9,10}$ | $Z_{9,2}$ | $Z_{9,3}$ | $Z_{9,4}$ | $Z_{9,5}$ | $Z_{9,6}$ |
| 10 | 0 | $Z_{11,2}$ | $Z_{11,3}$ | $Z_{11,4}$ | $Z_{11,5}$ | $Z_{11,6}$ |
| 11 | 0 | $Z_{12,2}$ | $Z_{12,3}$ | $Z_{12,4}$ | $Z_{12,5}$ | $Z_{12,6}$ |
| 12 | $Z_{13,1} - Z_{13,10}$ | $Z_{13,2}$ | $Z_{13,3}$ | $Z_{13,4}$ | $Z_{13,5}$ | $Z_{13,6}$ |
| 13 | $Z_{14,1} - Z_{14,10}$ | $Z_{14,2}$ | $Z_{14,3}$ | $Z_{14,4}$ | $Z_{14,5}$ | $Z_{14,6}$ |
| 14 | 0 | $Z_{15,2}$ | $Z_{15,3}$ | $Z_{15,4}$ | $Z_{15,5}$ | $Z_{15,6}$ |
| 15 | 0 | $Z_{16,2}$ | $Z_{16,3}$ | $Z_{16,4}$ | $Z_{16,5}$ | $Z_{16,6}$ |
| 16 | $Z_{17,1} - Z_{17,10}$ | $Z_{17,2}$ | $Z_{17,3}$ | $Z_{17,4}$ | $Z_{17,5}$ | $Z_{17,6}$ |
| 17 | 0 | $Z_{18,2}$ | $Z_{18,3}$ | $Z_{18,4}$ | $Z_{18,5}$ | $Z_{18,6}$ |

TO/FROM FIG. 7B

FIG. 7A

| | 7 | 8 | 9 | 10 | 11 | 12 |
|---|---|---|---|---|---|---|
| | $z_{1,7} - z_{10,1}$ | 0 | $z_{1,9} - z_{10,1}$ | 0 | 0 | $z_{1,13} - z_{10,1}$ |
| | $z_{2,7}$ | $z_{2,8}$ | $z_{2,9}$ | $z_{2,11}$ | $z_{2,12}$ | $z_{2,13}$ |
| | $z_{3,7}$ | $z_{3,8}$ | $z_{3,9}$ | $z_{3,11}$ | $z_{3,12}$ | $z_{3,13}$ |
| | $z_{4,7}$ | $z_{4,8}$ | $z_{4,9}$ | $z_{4,11}$ | $z_{4,12}$ | $z_{4,13}$ |
| | $z_{5,7}$ | $z_{5,8}$ | $z_{5,9}$ | $z_{5,11}$ | $z_{5,12}$ | $z_{5,13}$ |
| | $z_{6,7}$ | $z_{6,8}$ | $z_{6,9}$ | $z_{6,11}$ | $z_{6,12}$ | $z_{6,13}$ |
| | $z_{7,7}$ | $z_{7,8}$ | $z_{7,9}$ | $z_{7,11}$ | $z_{7,12}$ | $z_{7,13}$ |
| | $z_{8,7}$ | $z_{8,8}$ | $z_{8,9}$ | $z_{8,11}$ | $z_{8,12}$ | $z_{8,13}$ |
| | $z_{9,7}$ | $z_{9,8}$ | $z_{9,9}$ | $z_{9,11}$ | $z_{9,12}$ | $z_{9,13}$ |
| | $z_{11,7}$ | $z_{11,8}$ | $z_{11,9}$ | $z_{11,11}$ | $z_{11,12}$ | $z_{11,13}$ |
| | $z_{12,7}$ | $z_{12,8}$ | $z_{12,9}$ | $z_{12,11}$ | $z_{12,12}$ | $z_{12,13}$ |
| | $z_{13,7}$ | $z_{13,8}$ | $z_{13,9}$ | $z_{13,11}$ | $z_{13,12}$ | $z_{13,13}$ |
| | $z_{14,7}$ | $z_{14,8}$ | $z_{14,9}$ | $z_{14,11}$ | $z_{14,12}$ | $z_{14,13}$ |
| | $z_{15,7}$ | $z_{15,8}$ | $z_{15,9}$ | $z_{15,11}$ | $z_{15,12}$ | $z_{15,13}$ |
| | $z_{16,7}$ | $z_{16,8}$ | $z_{16,9}$ | $z_{16,11}$ | $z_{16,12}$ | $z_{16,13}$ |
| | $z_{17,7}$ | $z_{17,8}$ | $z_{17,9}$ | $z_{17,11}$ | $z_{17,12}$ | $z_{17,13}$ |
| | $z_{18,7}$ | $z_{18,8}$ | $z_{18,9}$ | $z_{18,11}$ | $z_{18,12}$ | $z_{18,13}$ |

ADAPTIVE REDUNDANCY-EXTRACTION FOR 3D ELECTROMAGNETIC SIMULATION OF ELECTRONIC SYSTEMS

BACKGROUND OF THE INVENTION

1. Field of the Invention

The present invention relates to redundancy extraction in electromagnetic simulation of an electronic device/system and, more particularly, to reducing the size of the matrices that are utilized to simulate the electromagnetic response of the electronic device/system.

2. Description of Related Art

Simulating the electrical behavior of a device/system, especially electromagnetic behavior, requires numerical/computational techniques, such as the so-called method of moments (MOM) method. These methods solve Maxwell's equations for each conductive layer of a device/system.

In these electromagnetic modeling methods, the response that the device/system has to excitation(s), such as incident waves or currents that excite these elements is determined. In the first step of such modeling, the entire surface of the element is broken up into simple mesh elements, such as small rectangles or squares, or small triangles. This first step, routinely done in these techniques is called mesh generation.

The purpose of mesh generation is to discretize equations on each cell of the mesh, or on each edge between each pair of cells, and to approximately solve these equations on the mesh by converting Maxwell's equations to a matrix equation. These steps are commonly known as the method of moments (MOM) method. The matrix system associated with MOM can be a large, dense system. The storage of such a matrix system takes computer memory that scales as the square of N (i.e., $N^2$) where the dimension of the matrix is N×N, i.e., a square matrix. The solution of this matrix utilizing standard methods takes time/CPU units proportional to the cube of N (i.e., $N^3$).

What would, therefore, be desirable are a method, system, and computer readable medium that enables solutions of electromagnetic problems that reduces the size of the matrix system with the accompanying improvement in computational time to solve such matrices.

SUMMARY OF THE INVENTION

The invention is a computer-implemented method of redundancy extraction in electromagnetic simulation of an electronic device/system comprising: (a) a processor of a computer discretizing first and second spaced conductive layers of a computer model of a 3D geometry of an electronic device/system into a first mesh M1 and second mesh M2, wherein each mesh includes a plurality of cells, and each pair of adjacent cells in each mesh is separated by an edge; (b) for each mesh, the processor estimating a magnitude and direction of current flow across each edge thereof in response to application of an exemplary bias to the geometry; (c) the processor determining at least one instance where one edge of M1 and one edge of M2 having a predetermined spatial relation to each other have equal magnitude and opposite direction current flows (EMODCF), wherein said at least one instance of EMODCF includes an edge E1 of M1 and an edge E2 of M2; (d) the processor determining a square impedance matrix Z* which, for each instance of EMODCF in step (c), has one less row than the total number of edges in M1 and M2 and which, for each instance of EMODCF in step (c), has one less column than the total number of edges in M1 and M2; (e) the processor determining a voltage column vector V* which, for each instance of EMODCF in step (c), has one less row than the total number of edges in M1 and M2; and (f) the processor determining a current column vector $[I^*]=[V^*]/[Z^*]$.

Subject to the impedance matrix Z* of step (d) not including a row of cells and a column of cells related to either edge E1 or edge E2, the cells of impedance matrix Z* can include impedance values $Z_{i,j}$, wherein i and j are separately indexed from 1 to n, where n=the total number of edges in M1 and M2; and each impedance value $Z_{i,j}$ is determined from a potential or voltage estimated to exist at an edge i based on a charge density or current estimated to exist at an edge j.

The method can further include, prior to step (f) the steps of: (g) the processor determining each edge of M2 that does not have a predefined relation to E2; and (h) the processor populating with a zero (0) value each cell of impedance matrix Z* that represents an edge pair comprised of E1 and one of the edges of M2 determined in step (g).

In step (c), the predetermined spatial relation between E1 and E2 can be parallel, substantially parallel, in alignment normal to a plane defined by M1 or M2, or substantially in alignment normal to a plane defined by M1 or M2. In step (g), the predefined relation can be each edge of M2 that touches E2.

The method can further include, prior to step (f), the steps of: (i) the processor determining each edge of M1 that does not have the predefined relation to E1; and (j) the processor populating with a zero (0) value each cell of impedance matrix Z* that represents an edge pair comprised of E2 and one of the edges of M1 determined in step (i).

The method can further include, prior to step (f), the steps of: (g) the processor determining each edge of M1 that does not have a predefined relation to E1; and (h) the processor populating with a zero (0) value each cell of impedance matrix Z* that represents an edge pair comprised of E2 and one of the edges of M1 determined in step (g).

The square impedance matrix Z* can be determined based on a square impedance matrix Z having the same number of rows as the number of edges in M1 and M2 and the same number of columns as the number of edges in M1 and M2. In the square impedance matrix Z*, row cells related to one of E1 and E2 from the square impedance matrix Z can be subtracted from row cells related to the other of E1 and E2 from the square impedance matrix Z. In the square impedance matrix Z*, column cells related to one of E1 and E2 from the square impedance matrix Z can be subtracted from column cells related to the other of E1 and E2 from the square impedance matrix Z.

The invention is also a system of redundancy extraction in electromagnetic simulation of an electronic device comprising: means for discretizing first and second spaced conductive layers of a computer model of a 3D geometry of an electronic device into a first mesh M1 and second mesh M2, wherein each mesh includes a plurality of cells, and each pair of adjacent cells in each mesh is separated by an edge; means for estimating for each mesh a direction of current flow across each edge thereof in response to application of an exemplary bias to the geometry; means for determining at least one instance where one edge of M1 and one edge of M2 having a predetermined spatial relation to each other have equal magnitude and opposite direction current flows (EMODCF), wherein said at least one instance of EMODCF includes an edge E1 of M1 and an edge E2 of M2; means for determining a square impedance matrix Z* having a number of columns i and a number of rows j, wherein for each instance of EMODCF, the number of rows j is one less than the total number of edges in M1 and M2 and wherein for each instance of EMODCF, the number of columns i is one less than the total number of edges in M1 and M2; means for determining a voltage column vector V* which, for each instance of EMODCF, has one less row than the total number of edges in M1 and M2; and means for determining a current column vector [I*]=[V*]/[Z*].

Subject to the impedance matrix Z* not including a row of cells and a column of cells related to one of edge E1 and edge E2, each cell of the impedance matrix Z* can include an impedance value $Z_{i,j}$ determined for a unique combination of a potential or voltage estimated to exist on an edge i based on a charge density or current estimated to exist at an edge j, wherein i and j are separately indexed from 1 to n, and n=the total number of edges in M1 and M2.

The system can further include: means for determining each edge of M2 that does not have a predefined relation to E2; and means for populating each cell of impedance matrix Z* that represents an edge pair comprised of E1 and one of said edges of M2 with a zero (0) value.

The predetermined spatial relation between E1 and E2 can be parallel, substantially parallel, in alignment normal to a plane defined by M1 or M2, or substantially in alignment normal to a plane defined by M1 or M2. The predefined relation can be each edge of M2 that touches E2.

The system can further include: means for determining each edge of M1 that does not have the predefined relation to E1; and means for populating each cell of impedance matrix Z* that represents an edge pair comprised of E2 and one of said edges of M1 with a zero (0) value.

The system can further include: means for determining each edge of M1 that does not have a predefined relation to E1; and means for populating each cell of impedance matrix Z* that represents an edge pair comprised of E2 and one of said edges of M1 with a zero (0) value.

The square impedance matrix Z* can be determined based on a square impedance matrix Z having the same number of rows as the number of edges in M1 and M2 and the same number of columns as the number of edges in M1 and M2. In the square impedance matrix Z*, row cells related to one of E1 and E2 from the square impedance matrix Z are subtracted from row cells related to the other of E1 and E2 from the square impedance matrix Z. In the square impedance matrix Z*, column cells related to one of E1 and E2 from the square impedance matrix Z are subtracted from column cells related to the other of E1 and E2 from the square impedance matrix Z.

Lastly, the invention is a computer readable medium having stored thereon instructions which, when executed by a processor of a computer, cause the processor to perform the steps of: (a) discretize first and second spaced conductive layers of a computer model of a 3D geometry of an electronic device/system into a first mesh M1 and second mesh M2, wherein each mesh includes a plurality of cells, and each pair of adjacent cells in each mesh is separated by an edge; (b) estimate for each mesh a magnitude and direction of current flow across each edge thereof in response to application of an exemplary bias to the geometry; (c) determine at least one instance where one edge of M1 and one edge of M2 having a predetermined spatial relation to each other have equal magnitude and opposite direction current flows (EMODCF), wherein said at least one instance of EMODCF includes edge E1 of M1 and edge E2 of M2; (d) determine a square impedance matrix Z* which, for each instance of EMODCF in step (c), has one less row than the total number of edges in M1 and M2 and which, for each instance of EMODCF in step (c), has one less column than the total number of edges in M1 and M2; (e) determine a voltage column vector V* which, for each instance of EMODCF in step (c), has one less row than the total number of edges in M1 and M2; and (f) determine a current column vector [I*]=[V*]/[Z*].

Subject to the impedance matrix Z* of step (d) not including, a row of cells and a column of cells related to one of E1 and E2, the cells of impedance matrix Z* can include impedance values $Z_{i,j}$, wherein: each impedance value $Z_{i,j}$ is determined from a voltage estimated to exist at an edge i based on a charge density or current estimated to exist at an edge j; and i and j are separately indexed from 1 to n, where n=the total number of edges in M1 and M2.

The instructions, prior to step (f), can further cause the processor to: (g) determine each edge of M2 that does not have a predefined spatial or geometric relation with E2; and (h) populate with a zero (0) value each cell of impedance matrix Z* that represents an edge pair comprised of E1 and one of the edges of M2 determined in step (g).

In step (c), the predetermined spatial or geometric relation between E1 and E2 is parallel, substantially parallel, in alignment normal to a plane defined by M1 or M2, or substantially in alignment normal to a plane defined by M1 or M2. In step (g), the predefined relation is each edge of M2 that touches E2.

The instructions, prior to step (f), can further cause the processor to: (i) determine each edge of M1 that does not have the predefined spatial or geometric relation with E1; and (j) populate with a zero (0) value each cell of impedance matrix Z* that represents an edge pair comprised of E2 and one of the edges of M1 determined in step (i).

The instructions, prior to step (f), can further cause the processor to: (g) determine each edge of M1 that does not have a predefined spatial or geometric relation with E1; and (h) populate with a zero (0) value each cell of impedance matrix Z* that represents an edge pair comprised of E2 and one of the edges of M1 determined in step (g).

The square impedance matrix Z* can be determined based on a square impedance matrix Z having the same number of rows as the number of edges in M1 and M2 and the same number of columns as the number of edges in M1 and M2. In the square impedance matrix Z*, row cells related to one of E1 and E2 from the square impedance matrix Z can be subtracted from row cells related to the other of E1 and E2 from the square impedance matrix Z. In the square impedance matrix Z*, column cells related to one of E1 and E2 from the square impedance matrix Z can be subtracted from column cells related to the other of E1 and E2 from the square impedance matrix Z.

BRIEF DESCRIPTION OF THE DRAWINGS

Figure 3A:
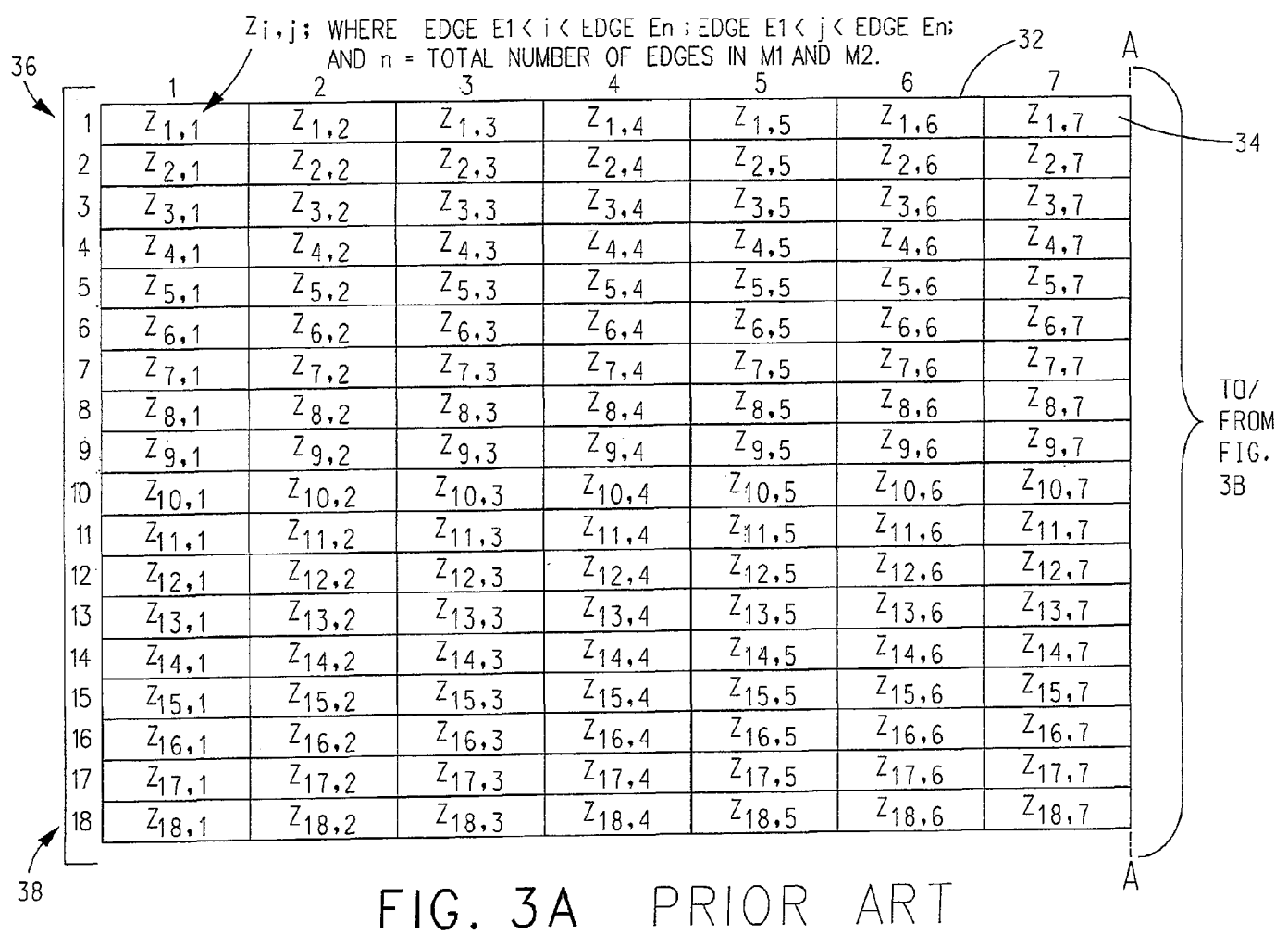

FIGS. 3A-3C are illustrations of an impedance matrix [Z], a voltage column vector [V], and a current column vector [I]

Figure 2A:
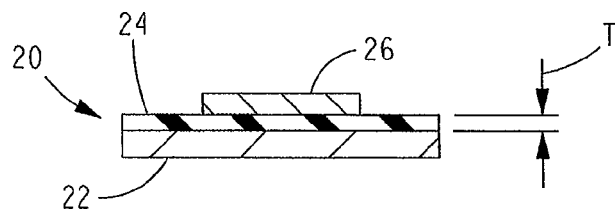
FIG. 2A is a cross-section of a portion of a device, such as an integrated circuit, that includes a lower conductive layer and an upper conductive layer separated by an insulating layer of thickness T.
Figure 2B:
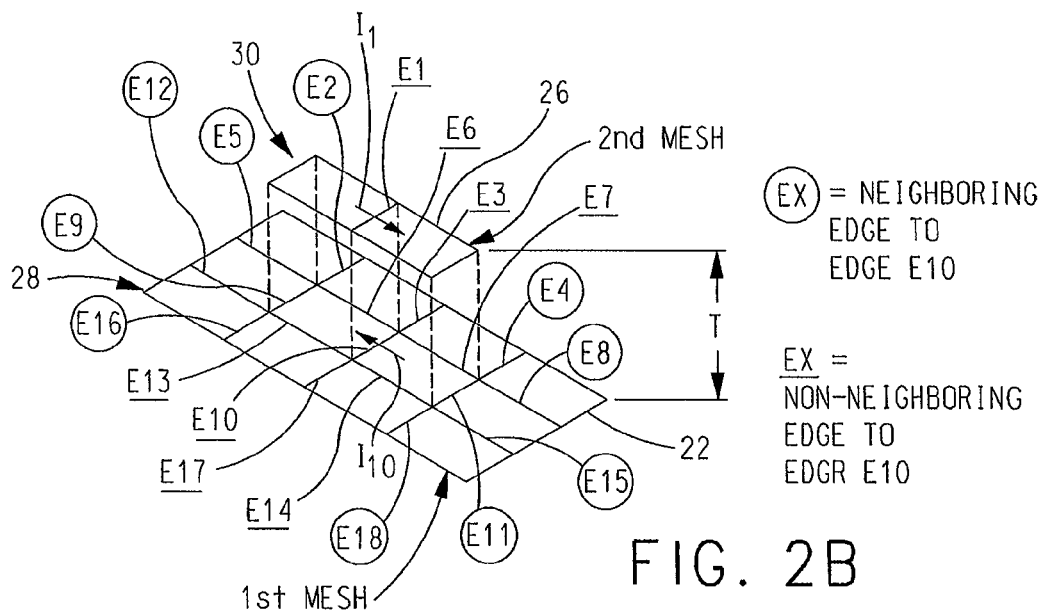
FIGS. 2B and 2C are perspective views of the conductive layers of the device shown in FIG. 2A after each conductive layer has been discretized into a mesh that includes either square cells (FIG. 2B) on triangular cells (FIG. 2C), with each pair of adjacent cells separated by an edge E.
Figure 3C:
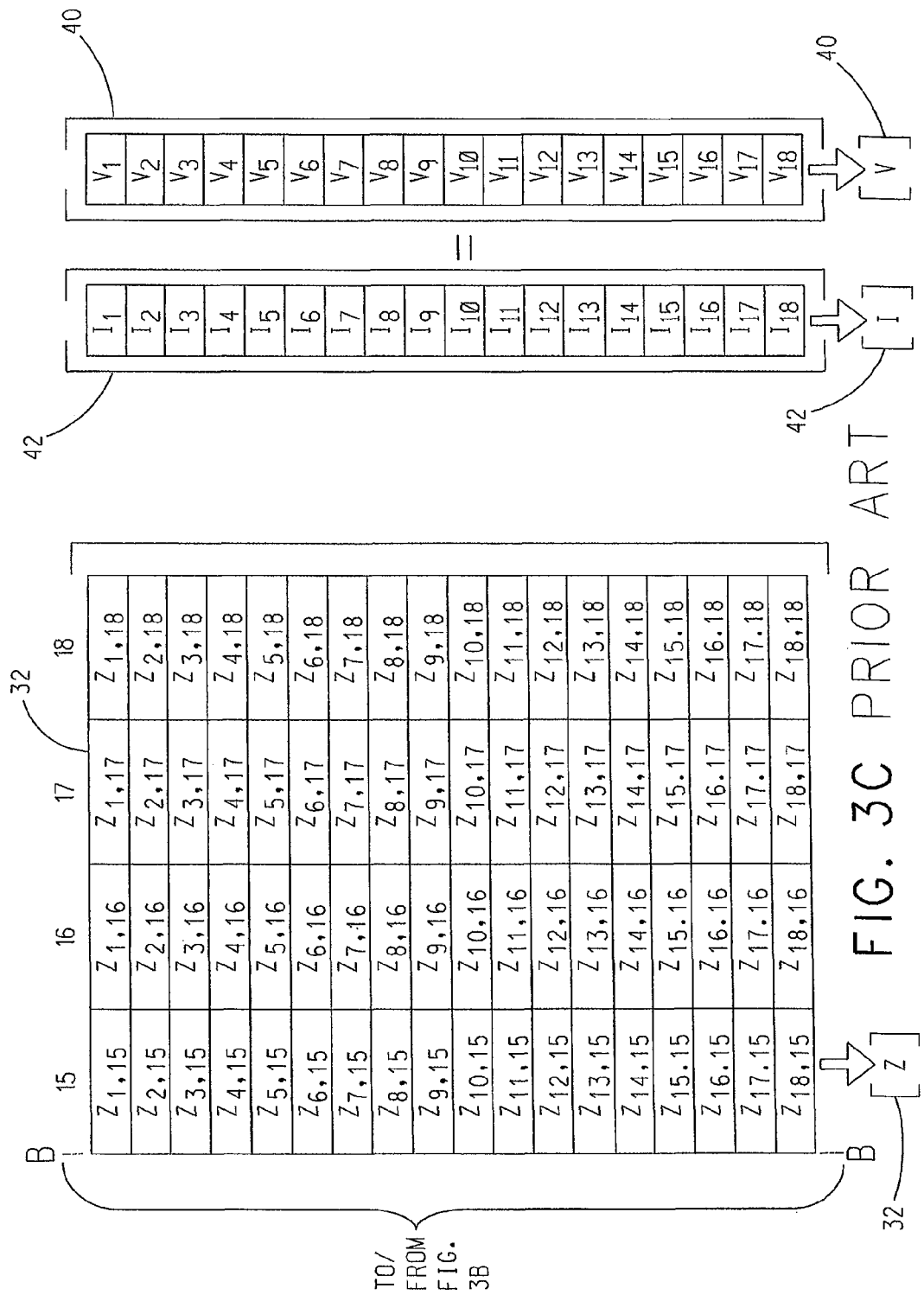
Figure 5C:
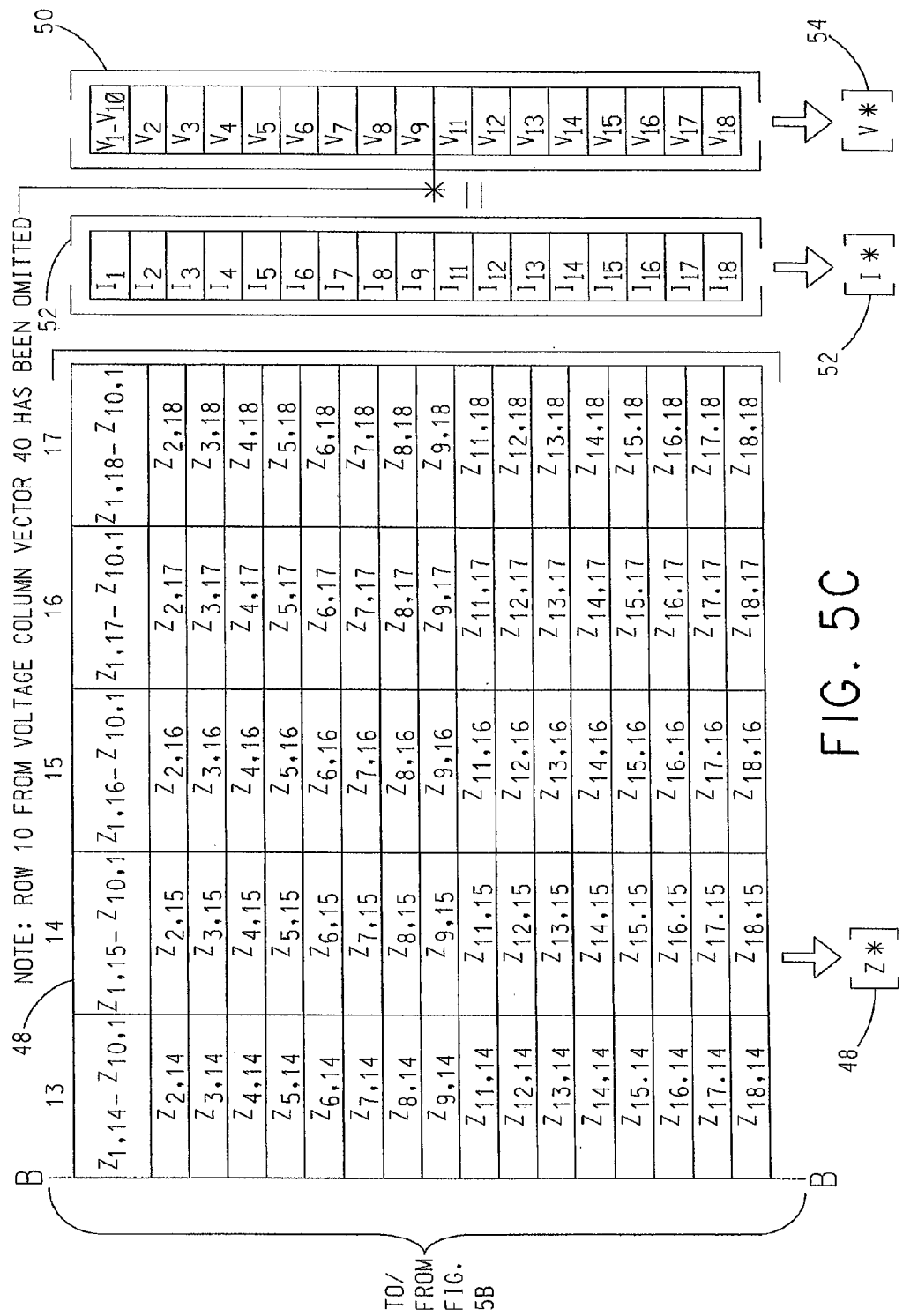
Figure 7C:
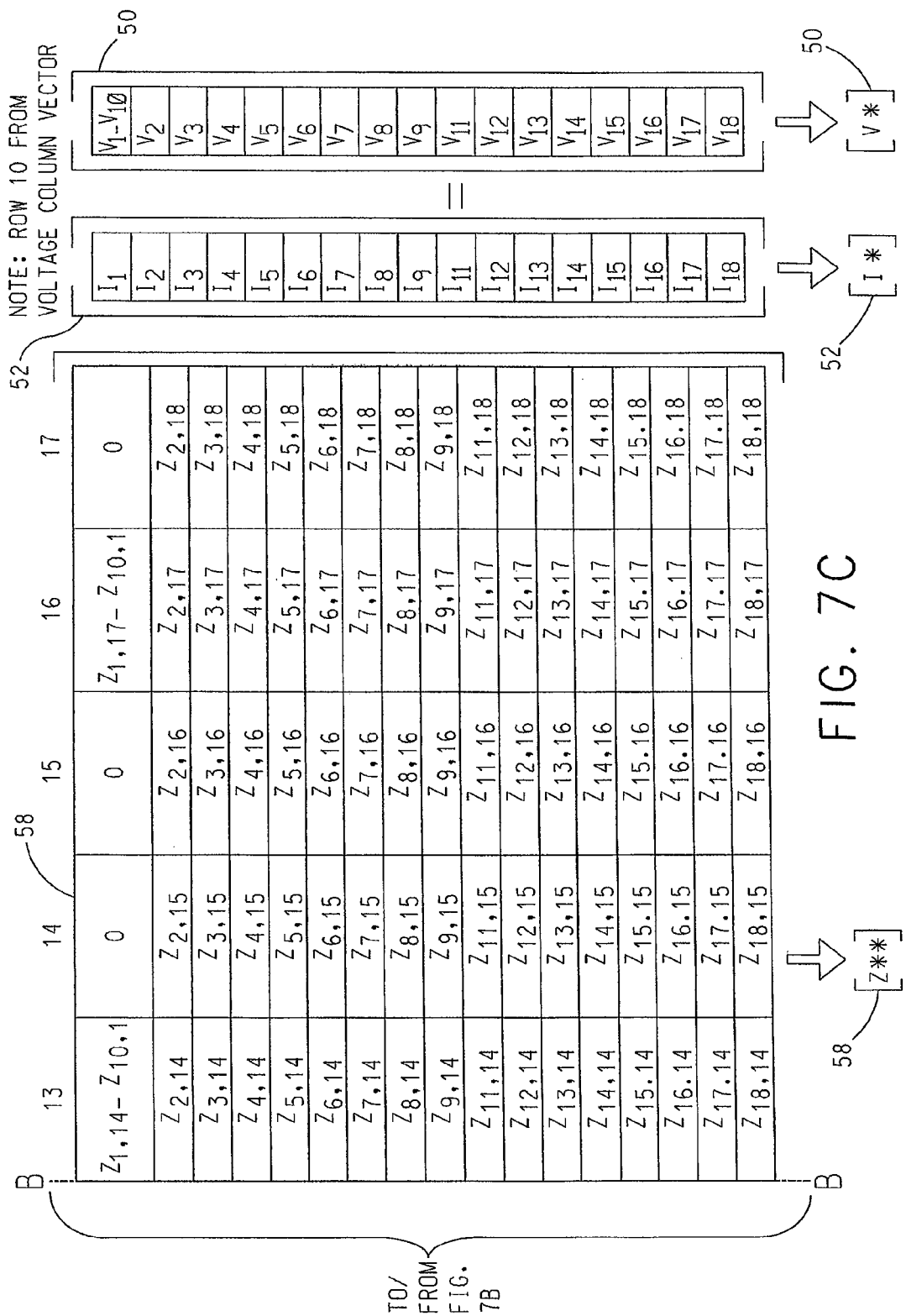

all of which are determined in accordance with the prior art method of moments technique;

Figure 4:
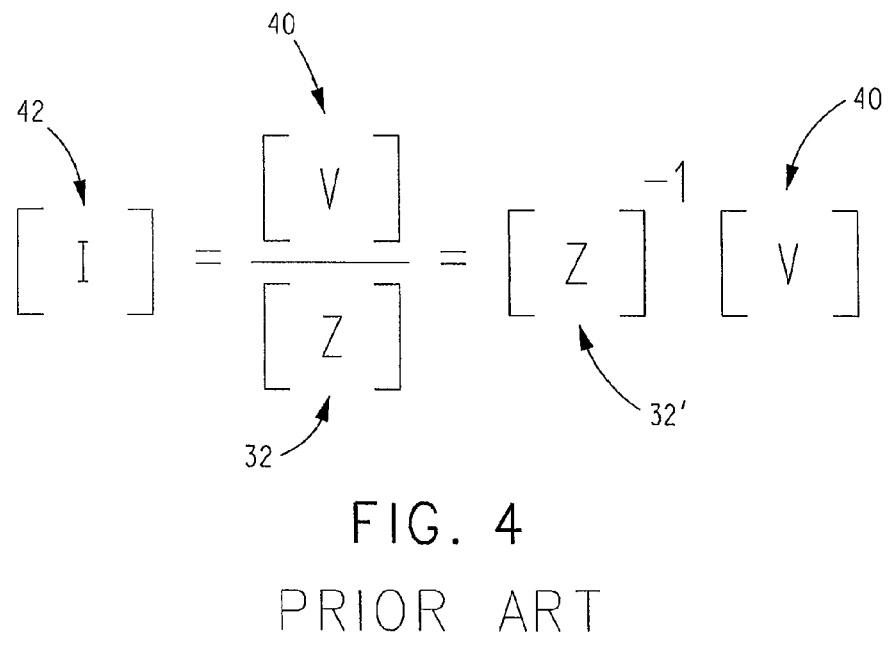

FIG. 4 is an illustration of a matrix equation for determining values of current I to be included in the cells of the current column vector [I] by dividing the voltage column vector [V] by the impedance matrix [Z] of FIGS. 3A-3C or by taking the inverse of the impedance matrix, i.e., $[Z]^{-1}$, shown in FIGS. 3A-3C and multiplying it by the voltage column vector [V] of FIGS. 3A-3B, all in a manner known in the art of linear algebra;

FIGS. 5A-5C illustrate an impedance matrix [Z*], a current column vector [I*], and a voltage column vector [V*] that are determined based on the elimination of a row and/or column in the matrices [Z], [I] and [V] in FIGS. 3A-3C due to the effect of differential currents flowing across edges E1 and E10 of the second and first meshes, respectively, shown in FIG. 2B;

Figures 6, 8:
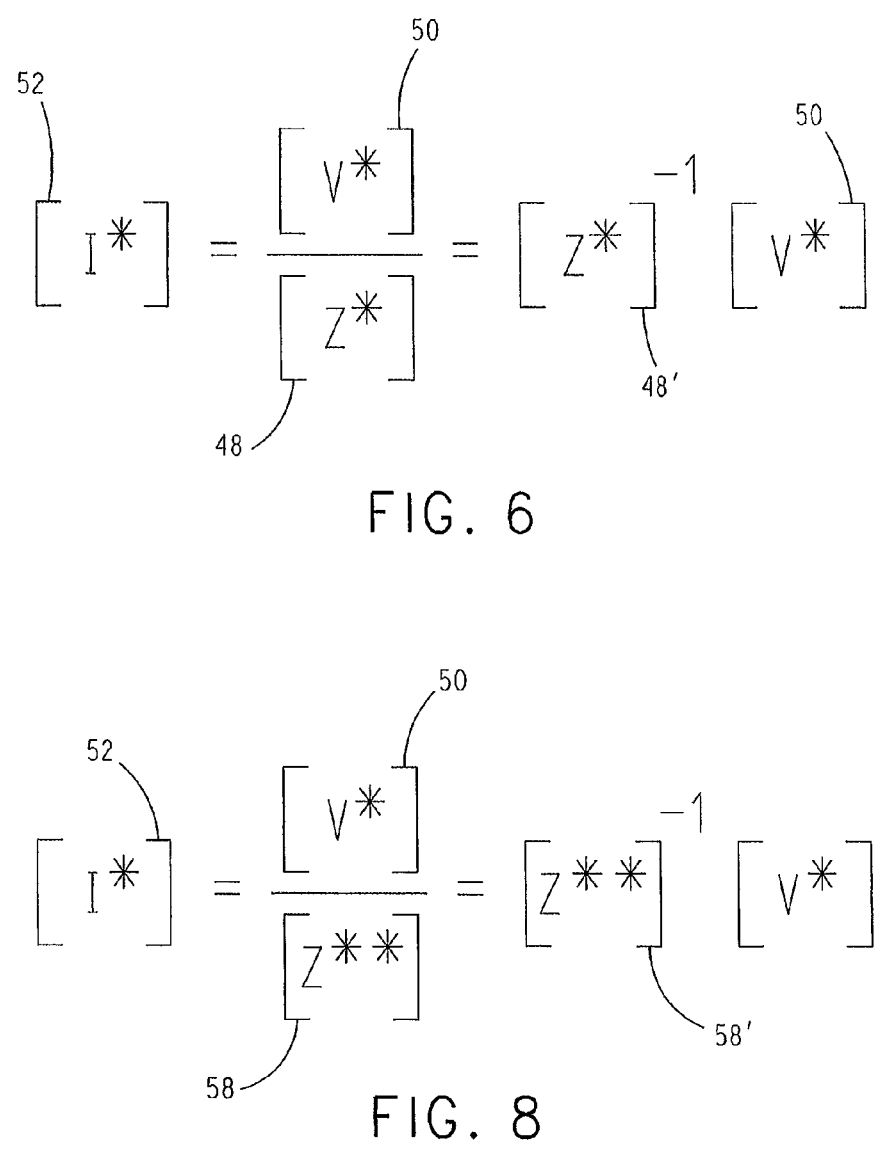

FIG. 6 is an illustration of a matrix equation for determining values of current I to be included in the cells of the current column vector [I*] based on the values of voltage V included in the cells of the voltage column vector [V*] and the values of impedance Z included in the cells of the impedance matrix [Z*] shown in FIGS. 5A-5C;

FIGS. 7A-7C illustrate the presolution current column vector [I*] and the voltage column vector [V*] of FIGS. 5A-5C and further illustrate an impedance matrix [Z**] derived from impedance matrix [Z*] shown in FIGS. 5A-5C after populating certain cells of row 1 and column 1 of impedance matrix [Z*] with values of 0 based on the pairs of edges represented by each cell populated with a value of 0 not having a predefined relationship to edges of the second and first meshes in FIG. 2B across which differential currents E1 and E10 flow; and FIG. 8 is an illustration of the matrix equation for determining values of current I to be included in the cells of the current column vector [I*] of FIG. 7C based on the values of voltage V included in the cells of the voltage column vector [V*] of FIG. 7C and the values of impedance Z or 0 included in the cells of impedance matrix [Z**] shown in FIGS. 7A-7C.

DETAILED DESCRIPTION OF THE INVENTION

The present invention will be described with reference to the accompanying figures where like reference numbers correspond to like elements.

Figure 1:
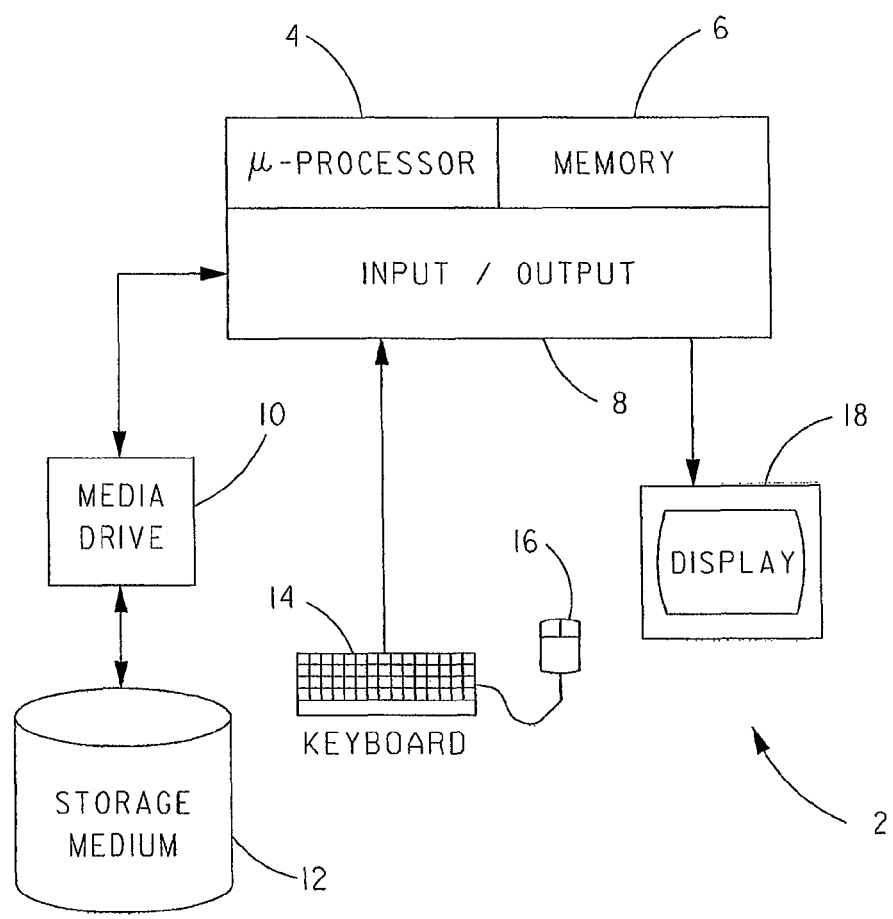
FIG. 1 is a block diagram of an exemplary computer system capable of implementing the present invention, including a memory for storing computer readable program code that causes the microprocessor of the computer to perform the steps of the method.

With reference to FIG. 1, the present invention is embodied in computer readable program code which executes on one or more computer systems 2. Each computer system 2 includes a microprocessor 4, a memory 6, and an input/output system 8. Each computer system 2 may also include a media drive 10, such as a disk drive, a CD-ROM drive, a flash memory drive, and the like. Computer system 2 can be operated under the control of the computer readable program code that resides in memory 6 or in a computer readable storage medium 12 that can be read by media drive 10. The computer readable program code is able to configure and operate computer system 2 in a manner to implement the present invention.

Input/output system 8 can include keyboard 14, a mouse 16, and/or display means 18, such as a video monitor, a printer or any other suitable and/or desirable display means for providing a visually perceptible image. Computer system 2 is exemplary of computer systems capable of executing the computer readable program code of the present invention and is not to be construed as limiting the invention.

Figure 2C:
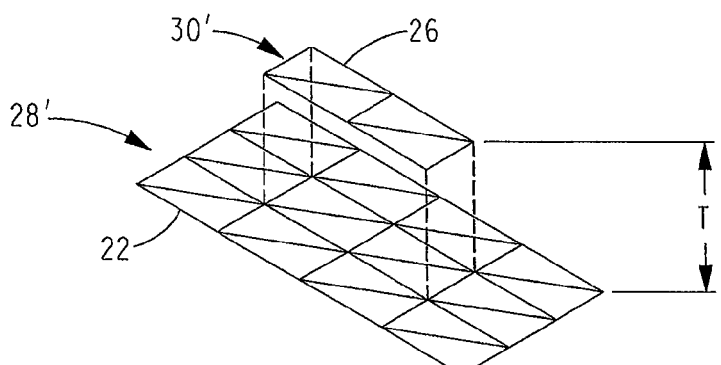

With reference to FIGS. 2A-2C, a simplified example of the present invention will now be described with reference to a multi-layer analytic or computer model of a device 20 that resides in memory 6 accessible by microprocessor 4 of computer system 2. For the purpose of describing the present invention, device 20 will be described as being a part of an integrated circuit. However, this is not to be construed as limiting the invention since device 20 can, also or alternatively, be a part of a printed circuit board, an electrical conductor, an aircraft, an automobile, an antenna, or any other suitable and/or desirable device having two or more layers of conductive materials spaced from each other.

FIG. 2A is a cross-sectional view of a portion of an integrated circuit device 20 that includes a lower conductive layer 22, an insulating layer 24 disposed atop lower conductive layer 22, and an upper conductive layer 26 disposed atop insulating layer 24. As shown, lower conductive layer 22 and upper conductive layer 26 are separated from each other by insulating layer 24 by a distance T.

FIGS. 2B and 2C are isolated, three-dimensional (3D) perspective views of lower conductive layer 22 and upper conductive layer 26 separated from each other by distance T. In FIGS. 2B and 2C, insulating layer 24 has been omitted for clarity. The patterns of lower conductive layer 22 and upper conductive layer 26 shown in FIGS. 2B and 2C reside as models in memory 6 accessible by microprocessor 4 of computer system 2. For the purpose of illustration and description, lower conductive layer 22 and upper conductive layer 26 in FIGS. 2B and 2C will be shown and described as not having any thickness. However, this is not to be construed as limiting the invention.

At a suitable time, microprocessor 4 of computer system 2 discretizes the computer models of lower conductive layer 22 and upper conductive layer 26 while maintaining in the model the spatial relationship of layers 22 and 26. More specifically, in the embodiment shown in FIG. 2B, microprocessor 4 of computer system 2 discretizes models of lower conductive layer 22 and upper conductive layer 26 residing in memory 6 into first and second discretized meshes 28 and 30, with each mesh 28 and 30 including a number of square or rectangular cells, and stores each discretized mesh 28 and 30 in memory 6 of computer system 2.

Alternatively, as shown in FIG. 2C, microprocessor 4 of computer system 2 can discretize lower conductive layer 22 and upper conductive layer 26 into first and second discretized meshes 28' and 30', with each mesh 28' and 30' including a number of triangular cells, and stores each discretized mesh 28' and 30' in memory 6 of computer system 2. The decision to discretize lower conductive layer 22 and upper conductive layer 26 into meshes formed from square or rectangular cells (FIG. 2B) or triangular cells (FIG. 2C) can be made by one of ordinary skill in the art. Accordingly, the discretization of lower conductive layer 22 and upper conductive layer 26 into square cells (FIG. 2B) or triangular cells (FIG. 2C) is not to be construed as limiting the invention. For the purpose of describing the invention hereinafter, reference will be made to the square or rectangular cells of discretized meshes 28 and 30 shown in FIG. 2B. However, this is not to be construed as limiting the invention.

Except at the boundaries of lower conductive layer 22 and upper conductive layer 26, the cells of each discretized mesh 28 and 30 are separated from each other by an edge E in memory 6. For example, first mesh 28 is discretized into a 3×4 array of cells, with each pair of adjacent cells separated by one of the edges E2-E18. Similarly, second mesh 30 is discretized into one pair of adjacent cells that are separated from each other by an edge E1.

In FIG. 2B, it should be noted that edge E1 is positioned in a predetermined spatial relation to edge E10 of first mesh 28.

In this example, edge E1 is aligned vertically above edge E10 in a direction normal to the plane defined by first mesh 28 and/or second mesh 30. It is envisioned, however, that the horizontal and vertical alignment of edge E1 relative to edge E10, or vice versa, in FIG. 2B can vary somewhat within tolerances selectable by one skilled in the art without affecting the practice of the invention in the manner described hereinafter.

Herein, it is assumed that the boundary edges, i.e., the periphery, of each mesh 28 and 30 do not have a current associated with them. This is a conventional assumption that is utilized when implementing the conventional method of moments (MOM) technique.

With reference to FIGS. 3A-3C and with continuing reference to FIG. 2B, the determination of an impedance matrix [Z] 32 in accordance with the prior art from discretized meshes 28 and 30 will now be described for the purpose of laying the groundwork for an understanding of the invention to be described hereinafter with reference to FIGS. 5A-8.

Impedance matrix [Z] 32 includes an X-Y array of cells 34, each of which includes an impedance value $Z_{i,j}$ which is due to a potential or voltage $V_i$ estimated to exist on an edge i of one of the discretized meshes 28 and 30 due to an initial unit charge density or current $I_j$ estimated to exist across an edge j of one of the discretized meshes 28 and 30. The initial potential or voltage $V_i$ and the initial charge density or current $I_j$ at and across each edge E of discretized meshes 28 and 30 are exemplary values that are determined by solving Maxwell's equations in a manner known in the art in response to the application of an exemplary model bias to device 20. For example, to determine for each mesh 28 and 30 a current I that flows across each edge E thereof and a potential voltage V induced at each edge E thereof in response to the application of an exemplary bias, Maxwell's equations are solved for meshes 28 and 30 independently. More specifically, the current I that flows across and the potential or voltage V induced at each edge of mesh 28 is determined by solving Maxwell's equation for mesh 28. Similarly, the current I that flows across and the potential or voltage V induced at each edge of mesh 30 is determined by solving Maxwell's equation for mesh 30.

In impedance matrix [Z] 32, the impedance value Z included in each cell of the first row 36 of impedance matrix [Z] 32 includes, from left to right: impedance value $Z_{1,1}$ equal to the potential or voltage $V_1$ at edge E1 due to the unit charge density at or current $I_1$ that flows across edge E1 (i.e., $V_1$ divided by $I_1$); impedance value $Z_{1,2}$ equal to the potential or voltage $V_1$ at edge $E_1$ due to the unit charge density at or current $I_2$ that flows across edge $E_2$ (i.e., $V_1$ divided by $I_2$); impedance value $Z_{1,3}$ equal to the potential or voltage $V_1$ at edge E1 due to the unit charge density at or current $I_3$ that flows across edge $E_3$ (i.e., $V_1$ divided by $I_3$); impedance value $Z_{1,4}$ equal to the initial potential or voltage $V_1$ at edge E1 due to the unit charge density at or current $I_4$ that flows across edge E4 (i.e., $V_1$ divided by $I_4$); etc.

In a similar manner, each other cell of impedance matrix 32 is populated with a suitable impedance value $Z_{i,j}$ where i=j, and i and j are independently indexed from one (1) to the total number of edges E in first and second meshes 28 and 30, i.e., 18 edges E. The impedance values Z in each row of impedance matrix [Z] 32 are for the initial potential or voltage $V_i$ estimated to exist along a particular edge $E_i$ due to initial charge densities at or current $I_j$ estimated to flow across all of the edges, one-at-a-time, of discretized meshes 28 and 30. For example, the eighteen (18) cells of row 38 of impedance matrix [Z] 32 include impedance values $Z_{18,j}$ due to the initial potential or voltage $V_{18}$ determined to exist at edge E18 and the initial unit charge densities or currents $I_j$ estimated to exist across edges E1-E18 (where the value of j is indexed from 1 to 18), respectively. The layout of impedance matrix [Z] 32 is not to be construed as limiting the invention since it is envisioned that the impedance values Z can be populated into the rows and columns of impedance matrix [Z] 32 in any suitable and/or desirable order selected in accordance with conventional practices known in the art of linear algebra.

The population of the cells of impedance matrix [Z] 32 with values of impedance Z based on potentials or voltages at edges E1-E18 of discretized meshes 28 and 30 and unit charge densities at or currents across edges E1-E18 of discretized meshes 28 and 30 is well known in the art and is utilized in the MOM method discussed above.

Microprocessor 4 of computer system 2 also determines a voltage column vector [V] 40 (FIG. 3C) that includes voltages $V_1$-$V_{18}$ corresponding to the potentials or voltages determined to exist at edges E1-E18, respectively. Once impedance matrix [Z] 32 (a square impedance matrix) and voltage column vector [V] 40 have been determined and stored in memory 6 of computer system 2, microprocessor 4 of computer system 2 solves the matrix equation shown in FIG. 4, wherein voltage column vector [V] 40 is divided by impedance matrix [Z] 32 to find the values $I_1$-$I_{18}$ to be included in the cells of a current column vector [I] 42. The current values $I_1$-$I_{18}$ included in current column vector [I] 42 represent the actual currents that flow across edges E1-E18 due to the cumulative effects of potentials or voltages at and charge densities or currents estimated to exist at or across all of the edges E of meshes 28 and 30 determined by solving Maxwell's equations for each mesh 28 and 30 independently. In practice, microprocessor 4 of computer system 2 determines the inverse of impedance matrix [Z] 32, i.e., $[Z]^{-1}$ 32'. Thereafter, microprocessor 4 of computer system 2 multiplies inverse impedance matrix $[Z]^{-1}$ 32' by voltage column vector [V] 40 utilizing linear algebra techniques well known in the art to determine the values of $I_1$-$I_{18}$ to be included in current column vector [I] 42.

As can be seen, with even the relatively simple discretized meshes 28 and 30 shown in FIG. 2B, a relatively large impedance matrix [Z] 32 is formed. As would be recognized by one of ordinary skill in the art, the computational time that microprocessor 4 takes to solve the matrix equation shown in FIG. 4 increases with increasing sizes of impedance matrix [Z] 32, voltage column vector [V] 40, and current column vector [I] 42. It would, therefore, be desirable to reduce the sizes of the impedance matrix [Z] and the voltage column vector [V] that microprocessor 4 needs to solve while maintaining a desired level of accuracy in the determination of the values of current I included in the current column vector [I].

Referring back to FIG. 2B, for each mesh 28 and 30 a magnitude and direction of current that flows across each edge E thereof (and the voltage induced at each edge E thereof in response to the application of an exemplary bias to device 20) can be determined. This is generally accomplished by solving Maxwell's equations for meshes 28 and 30 independently. It has been observed that where an edge in first mesh 28 having a predetermined spatial relation (e.g., in vertical alignment) with an edge in second mesh 30 has equal magnitude and opposite direction current flows (EMODCF) or differential currents, the contribution of these differential currents on edges outside of a predefined spatial relation with these edges can be ignored.

For example, assume that the magnitude and direction of current $I_1$ estimated to flow across edge $E_1$ is equal in magnitude but opposite in direction to current $I_{10}$ estimated to flow across edge $E_{10}$ as shown in FIG. 2B, i.e., $I_1$ and $I_{10}$ are differential currents. As a result of these equal magnitude opposite direction current flows across edges E1 and E10 in vertical or substantially vertical alignment with one another in first and second meshes 28 and 30, square impedance matrix [Z] 32 can be rewritten as square impedance [Z*] 48 shown in FIGS. 5A-5C which has one less row and one less column than impedance matrix [Z] 32 shown in FIGS. 3A-3C. More specifically, when current $I_1$ across edge E1 of second mesh 30 is equal in magnitude but opposite in direction to current $I_{10}$ across edge E10 in first mesh 28, wherein edges E1 and E10 have a predefined spatial relation to each other, in this example, in vertical or substantially vertical alignment, the impedances $Z_{10,j}$ and $Z_{i,10}$ of impedance matrix [Z] 32 included in row 10 and column 10 can be subtracted from the impedances $Z_{i,j}$ included in row 1 and column 1, respectively, to form impedance matrix [Z*] 48. Thereafter, row 10 and column 10 of square impedance matrix [Z] 32 can be omitted in impedance matrix [Z*] 48. Thus, impedance matrix [Z*] 48 will have one less row and one less column than impedance matrix [Z*] 32. Alternatively, the impedances of impedance matrix [Z] 32 included in row 1 and column 1 can be subtracted from the impedances included in row 10 and column 10, respectively, to form an impedance matrix that can be substituted for impedance matrix [Z*] 48, and row 1 and column 1 of square impedance matrix [Z] 32 can be omitted in this replacement impedance matrix. For the purpose of describing the present invention, it will be assumed hereinafter that the impedances of impedance matrix [Z] 32 included in row 10 and column 10 are subtracted from the impedances included in row 1 and column 1, respectively. However, this is not to be construed as limiting the invention.

The result of subtracting row 10 of impedance matrix [Z] 32 from row 1 of impedance matrix [Z] 32; subtracting column 10 of impedance matrix [Z] 32 from column 1 of impedance matrix [Z] 32; and eliminating row 10 and column 10 from impedance matrix [Z] 32 in FIGS. 3A-3C is shown in square matrix [Z*] 48 in FIGS. 5A-5C. Observing square of impedance matrix [Z*] 48, it can be seen that square impedance matrix [Z*] 48 has seventeen (17) rows and seventeen (17) columns, wherein row 10 and column 10 from square matrix [Z] 32 has been omitted in impedance matrix [Z*] 48. Similarly, as shown in FIG. 5C, in voltage column vector [V*] 54 the value $V_{10}$ from voltage column vector [V] 40 is subtracted from the value of $V_1$ from voltage column vector [V] 40 and the row (row 10) that included $V_{10}$ in voltage column vector [V] 40 is omitted from voltage column vector [V*] 50. The results of this operation are shown in voltage column vector [V*] 50 shown in FIG. 5C. Thus, voltage column vector [V*] 54 will have one less row than voltage column vector [V] 40.

Once square impedance matrix [Z*] 48 and voltage column vector [V*] 50 have been determined, a current column vector [I*] 52 can be determined by either dividing voltage column vector [V*] 50 by square impedance matrix [Z*] 48, or by multiplying the inverse of impedance matrix [Z*] 48, i.e., [Z*⁻¹] 48', by voltage column vector [V*] 50, as shown in FIG. 6.

The process of subtracting a row and column associated with a first edge (edge E10 in this example) from a respective row and column associated with a second edge (edge E1 in this example), and eliminating the subtracted rows and columns (row 10 and column 10 in this example) from impedance matrix [Z] 32 can be performed each time an edge in one matrix and an edge in another matrix have a predetermined spatial relation with each other and said edges have differential current flows, e.g., edges E1 and E10 in FIG. 2B. Thus, for each instance where one edge of a first matrix and one edge of a second matrix having the predetermined spatial relationship to each other have differential current flows, one row and one column can be omitted from a prior art impedance matrix, such as impedance matrix [Z] 32, to produce a reduced impedance matrix, like impedance matrix [Z*] 48, in a process known as matrix reduction or row-column elimination in linear algebra.

The matrix reduction or row-column elimination procedure described above in connection with FIGS. 5A-5C can be used alone if desired. However, if further simplification of matrix [Z*] 48 is desired, advantage can be taken of the observation that differential currents, e.g., current $I_1$ across edge E1 and current $I_{10}$ across edge E10 in FIG. 2B, to a very high degree of accuracy, generate electric and magnetic fields only in their immediate neighborhood. Accordingly, the effects of said differential currents on edges E of meshes 28 and 30 positioned away from the edges carrying said differential currents (outside of their immediate neighborhood) can be ignored with minimal or no effect on the accuracy of determining the current values I to be included in current column vector [I*] 52. Accordingly, a value of zero can be included in each cell of square impedance matrix [Z*] 48 that represents an edge pair comprised of an edge of a first mesh where one part of a differential current flows and each edge of a second mesh that is not a neighboring edge (i.e., an edge that does not have a predefined spatial relation) to an edge of a second mesh where the other part of the differential current flows. An example of this concept will now be described with reference to FIG. 2B, impedance matrix [Z*] 48 shown in FIGS. 5A-5C, and a sparse impedance matrix [Z**] 58 shown in FIGS. 7A-7C.

As shown in FIG. 2B, edges E1 and E10 have a predetermined spatial relation to each other and have differential (equal magnitude and opposite direction) currents $I_1$ and $I_{10}$. Because of these differential currents, electric and magnetic fields generated by currents $I_1$ and $I_{10}$ will only have an effect on the edges E of first mesh 28 neighboring edge E10. In this example, the neighboring edges are those edges that touch edge E10, namely, edges E3, E6, E7, E13, E14, and E17. The discussion herein of neighboring edges as those edges that touch a particular edge, in this example edge E10, is not to be construed as limiting the invention since it is envisioned that neighboring edges can be defined in any suitable and/or desirable manner. For example, a neighboring edge may be one that is within a predefined distance of an edge E across which a differential current flows, an edge E having some predefined spatial or geometrical relation to an edge E across which a differential current flows, and the like.

Because neighboring edges E3, E6, E7, E13, E14, and E17 can be affected by the electric and magnetic fields produced by the differential current $I_1$ and $I_{10}$ that flow across edges E1 and E10 and the voltages $V_1$ and $V_{10}$ at edges E1 and E10, the effects of differential currents $I_1$ and $I_{10}$ flowing across edges E1 and E10 and the potential or voltages $V_1$ and $V_{10}$ at edges E1 and E10 are retained in sparse impedance matrix [Z**] 58. Thus, the impedance values Z included in the following rows (R) and columns (C) related to edge E1 (i.e., row 1 and column 1) of impedance matrix [Z*] 48 shown in FIGS. 5A-5C, are retained in sparse impedance matrix [Z**] 58 shown in FIGS. 7A-7C: R1, C1; R1, C3; R1, C6; R1, C7; R1, C12; R1, C13; R1, C16; R3, C1; R6, C1; R7, C1; R12, C1; R13, C1; and R16, C1.

However, because differential currents $I_1$ and $I_{10}$ do not generate any (or substantially any) electric or magnetic fields outside their immediate neighborhood, the cells of impedance matrix [Z*] 48 that represent the interaction between edge E1 and each edge that is not an immediate neighbor of edge E10 can be set to zero as shown in sparse impedance matrix [Z**] 58 shown in FIGS. 7A-7C, wherein the following rows (R) and columns (C) of sparse impedance matrix 58 have been set to zero: R1, C2; R1, C4; R1, C5; R1, C8; R1, C9; R1, C10; R1, C11; R1, C14; R1, C15; R1, C17; R2, C1; R4, C1; R5, C1; R8, C1; R9, C1; R10, C1; R11, C1; R14, C1; R15, C1; and R17, C1. In FIG. 2B, each edge that is not an immediate neighbor of edge E10 has been circled and each edge that is an immediate neighbor of edge E10 has been underlined to facilitate an understanding of the invention.

While the invention has been described in connection with the simplified embodiment shown in FIG. 2B, it is to be appreciated that impedance values Z can also be included in the cells of sparse impedance matrix [Z] 58 for edges of second mesh 30 in the immediate neighborhood of edge E1 (if such edges actually existed) and zero (0) values can be included in the cells of sparse impedance matrix [Z] 58 for edges of second mesh 30 not in the immediate neighborhood of edge E1. In other words, each cell of sparse impedance matrix [Z] 58 that represents an edge pair comprising an edge that carries a differential current and one edge that is in the immediate neighborhood of differential current carrying edge can be populated with an appropriate impedance value. In contrast, each cell of sparse impedance matrix [Z] 58 that represents an edge pair comprised of a differential current carrying edge and one edge that is not in the immediate neighborhood of said differential current carrying edge can be populated with the value of zero (0).

With reference to FIG. 8 and with continuing reference to FIGS. 7A-7C, once the cells of sparse impedance matrix [Z**] 58 have been populated with appropriate values of impedance Z or 0, current column vector [I*] 52 can be solved by microprocessor 4 by dividing voltage column vector [V*] 50 (determined in the manner discussed above) by sparse impedance matrix [Z**] 58, or by multiplying voltage column vector [V*] 50 by the inverse of impedance matrix [Z] 58, namely, $[Z^{}]^{-1}$ 58'.

The concept of a neighboring edge described above, wherein, neighboring edges touch edge E10 having a differential current $I_{10}$ flowing thereacross is not to be construed as limiting the invention. To this end, it is envisioned that a neighboring edge could be any edge that has a predefined relation to an edge across which a differential current flows, such as, without limitation: edges within a predefined distance of an edge across which a differential current flows; edges having some predefined spatial and/or geometrical relation to an edge across which a differential current flows; etc. The decision to characterize an edge as being a neighboring edge to an edge that carries a differential current can be made by one of ordinary skill in the art, e.g., based on physical and/or electrical conditions being analyzed, a desired degree of accuracy, and the like.

As can be seen, the present invention involves eliminating at least one row and at least one column of an impedance matrix and at least one row of a voltage column vector for each differential current that flows across edges of meshes defined for spaced conductive layers. Thereafter, if desired, zeros can be populated into cells of the impedance matrix related to edges of the impedance matrices that are not neighboring to each edge that carries a differential current.

To this end, for each differential current, e.g., current $I_1$ and $I_{10}$ in FIG. 2B, at least a single row and a single column can be eliminated from a conventional impedance matrix and at least a single row can be eliminated from a conventional voltage column matrix. For cells of the impedance matrix that represent edges where there is deemed to be an insufficient interaction between a differential current and a non-differential current, the values in these cells can be set to zero. All other cells of the impedance matrix can be left untouched as in a standard MOM method.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A computer-implemented method of redundancy extraction in electromagnetic simulation of an electronic device/system comprising:
   (a) a processor of a computer discretizing first and second spaced conductive layers of a computer model of a 3D geometry of an electronic device/system into a first mesh M1 and second mesh M2, wherein each mesh includes a plurality of cells, and each pair of adjacent cells in each mesh is separated by an edge;
   (b) for each mesh, the processor estimating a magnitude and direction of current flow across each edge thereof in response to application of an exemplary bias to the geometry;
   (c) the processor determining at least one instance where one edge of M1 and one edge of M2 having a predetermined spatial relation to each other have equal magnitude and opposite direction current flows (EMODCF), wherein said at least one instance of EMODCF includes an edge E1 of M1 and an edge E2 of M2;
   (d) the processor determining a square impedance matrix Z* which, for each instance of EMODCF in step (c), has one less row than the total number of edges in M1 and M2 and which, for each instance of EMODCF in step (c), has one less column than the total number of edges in M1 and M2, wherein: the square impedance matrix Z* is determined based on a square impedance matrix Z having the same number of rows as the number of edges in M1 and M2 and the same number of columns as the number of edges in M1 and M2; in the square impedance matrix Z*, row cells related to one of E1 and E2 from the square impedance matrix Z are subtracted from row cells related to the other of E1 and E2 from the square impedance matrix Z; and in the square impedance matrix Z*, column cells related to one of E1 and E2 from the square impedance matrix Z are subtracted from column cells related to the other of E1 and E2 from the square impedance matrix Z;
   (e) the processor determining a voltage column vector V* which, for each instance of EMODCF in step (c), has one less row than the total number of edges in M1 and M2; and (f) the processor determining a current column vector [I*]=[V*]/[Z*].

2. The method of claim 1, wherein, subject to the impedance matrix Z* of step (d) not including a row of cells and a column of cells related to either edge E1 or edge E2, the cells of impedance matrix Z* include impedance values $Z_{i,j}$, wherein i and j are separately indexed from 1 to n, where n=the total number of edges in M1 and M2; and
   each impedance value $Z_{i,j}$ is determined from a potential or voltage estimated to exist at an edge i based on a charge density or current estimated to exist at an edge j.

3. The method of claim 1, further including, prior to step (f):
   (g) the processor determining each edge of M2 that does not have a predefined relation to E2; and (h) the processor populating with a zero (0) value each cell of impedance matrix Z* that represents an edge pair comprised of E1 and one of the edges of M2 determined in step (g).

4. The method of claim 3, wherein,
in step (c), the predetermined spatial relation between E1 and E2 is parallel, substantially parallel, in alignment normal to a plane defined by M1 or M2, or substantially in alignment normal to a plane defined by M1 or M2; and
in step (g), the predefined relation is each edge of M2 that touches E2.

5. The method of claim 3, further including, prior to step (f):
(i) the processor determining each edge of M1 that does not have the predefined relation to E1; and
(j) the processor populating with a zero (0) value each cell of impedance matrix Z* that represents an edge pair comprised of E2 and one of the edges of M1 determined in step (i).

6. The method of claim 1, further including, prior to step (f):
(g) the processor determining each edge of M1 that does not have a predefined relation to E1; and
(h) the processor populating with a zero (0) value each cell of impedance matrix Z* that represents an edge pair comprised of E2 and one of the edges of M1 determined in step (g).

7. A system of redundancy extraction in electromagnetic simulation of an electronic device comprising: at least one computer processor;
means for discretizing first and second spaced conductive layers of a computer model of a 3D geometry of an electronic device into a first mesh M1 and second mesh M2, wherein each mesh includes a plurality of cells, and each pair of adjacent cells in each mesh is separated by an edge;
means for estimating for each mesh a direction of current flow across each edge thereof in response to application of an exemplary bias to the geometry;
means for determining at least one instance where one edge of M1 and one edge of M2 having a predetermined spatial relation to each other have equal magnitude and opposite direction current flows (EMODCF), wherein said at least one instance of EMODCF includes an edge E1 of M1 and an edge E2 of M2;
means for determining a square impedance matrix Z* having a number of columns i and a number of rows j, wherein for each instance of EMODCF, the number of rows j is one less than the total number of edges in M1 and M2 and wherein for each instance of EMODCF, the number of columns i is one less than the total number of edges in M1 and M2, wherein: the square impedance matrix Z* is determined based on a square impedance matrix Z having the same number of rows as the number of edges in M1 and M2 and the same number of columns as the number of edges in M1 and M2; in the square impedance matrix Z*, row cells related to one of E1 and E2 from the square impedance matrix Z are subtracted from row cells related to the other of E1 and E2 from the square impedance matrix Z; and in the square impedance matrix Z*, column cells related to one of E1 and E2 from the square impedance matrix Z are subtracted from column cells related to the other of E1 and E2 from the square impedance matrix Z;
means for determining a voltage column vector V* which, for each instance of EMODCF, has one less row than the total number of edges in M1 and M2; and
means for determining a current column vector [I*]=[V*]/[Z*].

8. The system of claim 7, wherein, subject to the impedance matrix Z* not including a row of cells and a column of cells related to one of edge E1 and edge E2, each cell of the impedance matrix Z* includes an impedance value $Z_{i,j}$ determined for a unique combination of a potential or voltage estimated to exist on an edge i based on a charge density or current estimated to exist at an edge j, wherein i and j are separately indexed from 1 to n, and n=the total number of edges in M1 and M2.

9. The system of claim 7, further including:
means for determining each edge of M2 that does not have a predefined relation to E2; and
means for populating each cell of impedance matrix Z* that represents an edge pair comprised of E1 and one of said edges of M2 with a zero (0) value.

10. The system of claim 9, wherein,
the predetermined spatial relation between E1 and E2 is parallel, substantially parallel, in alignment normal to a plane defined by M1 or M2, or substantially in alignment normal to a plane defined by M1 or M2; and
the predefined relation is each edge of M2 that touches E2.

11. The system of claim 9, further including:
means for determining each edge of M1 that does not have the predefined relation to E1; and
means for populating each cell of impedance matrix Z* that represents an edge pair comprised of E2 and one of said edges of M1 with a zero (0) value.

12. The system of claim 7, further including:
means for determining each edge of M1 that does not have a predefined relation to E1; and
means for populating each cell of impedance matrix Z* that represents an edge pair comprised of E2 and one of said edges of M1 with a zero (0) value.

13. A non-transitory computer readable medium having stored thereon instructions which, when executed by a processor of a computer, cause the processor to perform the steps of:
(a) discretize first and second spaced conductive layers of a computer model of a 3D geometry of an electronic device/system into a first mesh M1 and second mesh M2, wherein each mesh includes a plurality of cells, and each pair of adjacent cells in each mesh is separated by an edge;
(b) estimate for each mesh a magnitude and direction of current flow across each edge thereof in response to application of an exemplary bias to the geometry;
(c) determine at least one instance where one edge of M1 and one edge of M2 having a predetermined spatial relation to each other have equal magnitude and opposite direction current flows (EMODCF), wherein said at least one instance of EMODCF includes edge E1 of M1 and edge E2 of M2;
(d) determine a square impedance matrix Z* which, for each instance of EMODCF in step (c), has one less row than the total number of edges in M1 and M2 and which, for each instance of EMODCF in step (c), has one less column than the total number of edges in M1 and M2, wherein the square impedance matrix Z* is determined based on a square impedance matrix Z having the same number of rows as the number of edges in M1 and M2 and the same number of columns as the number of edges in M1 and M2; in the square impedance matrix Z*, row cells related to one of E1 and E2 from the square impedance matrix Z are subtracted from row cells related to the other of E1 and E2 from the square impedance matrix Z;

and in the square impedance matrix Z*, column cells related to one of E1 and E2 from the square impedance matrix Z are subtracted from column cells related to the other of E1 and E2 from the square impedance matrix Z;
(e) determine a voltage column vector V* which, for each instance of EMODCF in step (c), has one less row than the total number of edges in M1 and M2; and
(f) determine a current column vector [I*]=[V*]/[Z*].

14. The non-transitory computer readable medium of claim 13, wherein, subject to the impedance matrix Z* of step (d) not including a row of cells and a column of cells related to one of E1 and E2, the cells of impedance matrix Z* include impedance values $Z_{i,j}$, wherein:
each impedance value $Z_{i,j}$ is determined from a voltage estimated to exist at an edge i based on a charge density or current estimated to exist at an edge j; and
i and j are separately indexed from 1 to n, where n=the total number of edges in M1 and M2.

15. The non-transitory computer readable medium of claim 13, further including, prior to step (f), the instructions cause the processor to:
(g) determine each edge of M2 that does not have a predefined spatial or geometric relation with E2; and
(h) populate with a zero (0) value each cell of impedance matrix Z* that represents an edge pair comprised of E1 and one of the edges of M2 determined in step (g).

16. The non-transitory computer readable medium of claim 15, wherein,
in step (c), the predetermined spatial or geometric relation between E1 and E2 is parallel, substantially parallel, in alignment normal to a plane defined by M1 or M2, or substantially in alignment normal to a plane defined by M1 or M2; and
in step (g), the predefined relation is each edge of M2 that touches E2.

17. The non-transitory computer readable medium of claim 15, further including, prior to step (f), the instructions cause the processor to:
(i) determine each edge of M1 that does not have the predefined spatial or geometric relation with E1; and
(j) populate with a zero (0) value each cell of impedance matrix Z* that represents an edge pair comprised of E2 and one of the edges of M1 determined in step (i).

18. The non-transitory computer readable medium of claim 13, further including, prior to step (f), the instructions cause the processor to:
(g) determine each edge of M1 that does not have a predefined spatial or geometric relation with E1; and
(h) populate with a zero (0) value each cell of impedance matrix Z* that represents an edge pair comprised of E2 and one of the edges of M1 determined in step (g).

* * * * *